(12) United States Patent
Chuang

(10) Patent No.: US 6,923,310 B2
(45) Date of Patent: Aug. 2, 2005

(54) FOOTWEAR ARTICLE CONVEYER

(76) Inventor: Hsi-Fa Chuang, No. 186-8, Tun-Ho Rd., Tsao-Tun Chen, Nan-Tou Hsien (TW)

( * ) Notice: Subject to any disclaimer, the term of this patent is extended or adjusted under 35 U.S.C. 154(b) by 0 days.

(21) Appl. No.: 10/681,708

(22) Filed: Oct. 8, 2003

(65) Prior Publication Data

US 2005/0040012 A1 Feb. 24, 2005

(51) Int. Cl.[7] ............................................. B65G 37/00
(52) U.S. Cl. ..................................... 198/465.1; 12/1 A
(58) Field of Search ........................... 198/465.1, 465.4; 12/1 A

(56) References Cited

U.S. PATENT DOCUMENTS 3,630,502 A * 12/1971 Schmidt .................. 198/465.1

6,561,338 B2 * 5/2003 Ito et al. .................. 198/465.1
6,698,574 B2 * 3/2004 Frommenwiler et al. 198/465.1

* cited by examiner

Primary Examiner—Joseph Valenza
(74) Attorney, Agent, or Firm—Craig J. Yudell; Dillon & Yudell LLP

(57) ABSTRACT

A footwear article conveyer includes an article-conveying line for receiving carriers thereon, a first driving unit for driving the carriers to move simultaneously along the article-conveying line, a carrier-returning line separate from the article-conveying line, a first shifting unit for shifting one of the carriers from one end of the article-conveying line to one end of the carrier-returning line, a second driving unit for driving carrier movement along the carrier-returning line, and a second shifting unit for shifting carriers from the other end of the carrier-returning line to the other end of the article-conveying line.

3 Claims, 9 Drawing Sheets

US 6,923,310 B2

FOOTWEAR ARTICLE CONVEYER

BACKGROUND OF THE INVENTION

1. Field of the Invention

This invention relates to a footwear article conveyer; more particularly to a footwear article conveyer with carrier shifting units.

2. Description of the Related Art

FIG. 1 illustrates a conventional footwear article conveyer for conveying footwear articles through a work station 3, such as a vacuum drying station with a pair of juxtaposed vacuum chambers. The footwear articles are placed in carriers 2 that are mounted slidably on an elongated looped frame 1, which has a lower section 61 extending through the work station 3, and an upper section 62 that is disposed above the lower section 61. The footwear articles, which are to be processed, are carried to one side of the frame 1 through a conveyer 4, and are subsequently loaded to one of the carriers 2, that is disposed at the side of the frame 1. The footwear articles, which are processed through the work station 3, are unloaded at the other side of the frame 1 and are subsequently carried away by a second conveyer 5. The carriers 2 are intermittently driven by a driving unit (not shown) to slide simultaneously along the frame 1. The sliding speeds for all of the carriers 2 on the lower and upper sections 61, 62 of the frame 1 are the same.

The conventional footwear article conveyer is disadvantageous in that a great number of the carriers 2 are required to be hung on the upper section 62 of the frame 1 so as to permit continuous feeding of the footwear articles through the work station 3. As a consequence, the capital cost is considerably increased. Moreover, the footwear articles are likely to fall off from the carriers 2, which are moved to the upper section 62 of the frame 1.

SUMMARY OF THE INVENTION

Therefore, the object of the present invention is to provide a footwear article conveyer that is capable of overcoming the aforesaid drawbacks of the prior art.

According to the present invention, there is provided a footwear article conveyer adapted for use with a plurality of carriers so as to carry footwear articles through a series of work stations. The footwear article conveyer comprises: an article-conveying line adapted to extend through the work stations, adapted to receive the carriers thereon and to permit sliding movement of the carriers thereon, and having an article-loading end and an article-unloading end; a first driving unit adapted to drive the carriers to move simultaneously along the article-conveying line; a carrier-returning line separate from the article-conveying line and having a carrier-loading end and a carrier-unloading end; a first shifting unit adapted to shift one of the carriers, which is disposed at the article-unloading end of the article-conveying line, from the article-conveying line to the carrier-loading end of the carrier-returning line; a second driving unit adapted to drive said one of the carriers to move along the carrier-returning line from the carrier-loading end to the carrier-unloading end; a second shifting unit adapted to shift said one of the carriers from the carrier-unloading end of the carrier-returning line to the article-loading end of the article-conveying line; and a controller that is coupled electrically to the first and second driving units and the first and second shifting units for controlling the movement of the carriers on the article-conveying line and the carrier-returning line in such a manner that each of the carriers on the article-conveying line has a first duration time, which is the time required for moving from the article-loading end to the article-unloading end, and that each of the carriers on the carrier-returning line has a second duration time, which is the time required for moving from the carrier-loading end to the carrier-unloading end and which is shorter than the first duration time.

BRIEF DESCRIPTION OF THE DRAWINGS

In drawings which illustrate an embodiment of the invention.

DETAILED DESCRIPTION OF THE PREFERRED EMBODIMENT

FIGS. 2 to 6 illustrate the preferred embodiment of a footwear article conveyer when used with a plurality of carriers 100 for carrying footwear articles 300 (see FIGS. 2 and 5) through a series of work stations 250, such as a washing station, a first drying station, a preliminary adhesive coating station, a second drying station, a secondary adhesive coating station, a third drying station, and a vacuum drying station, in accordance with this invention.

Figure 3:
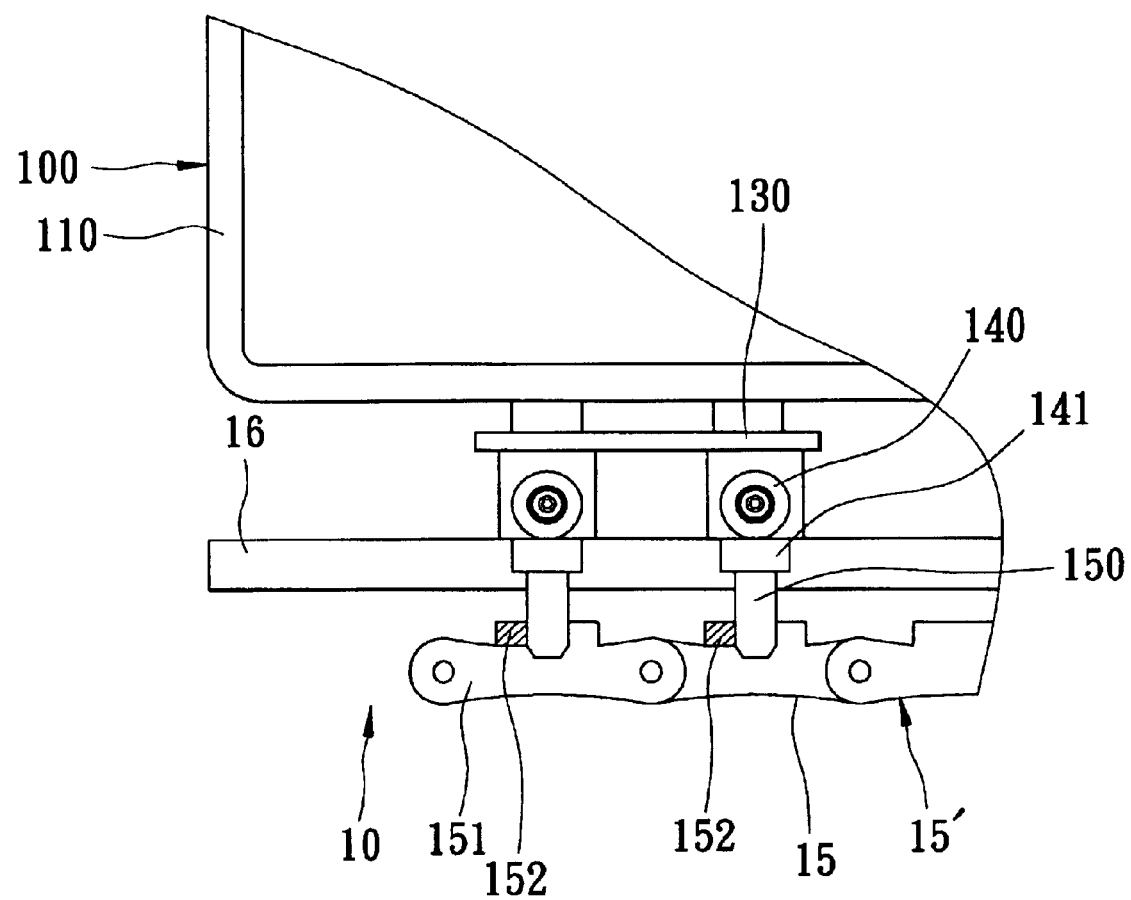
FIG. 3 is a schematic, fragmentary side view to illustrate how a carrier is slid on an article-conveying line by a chain of the conveyer of FIG. 2.
Figure 4:
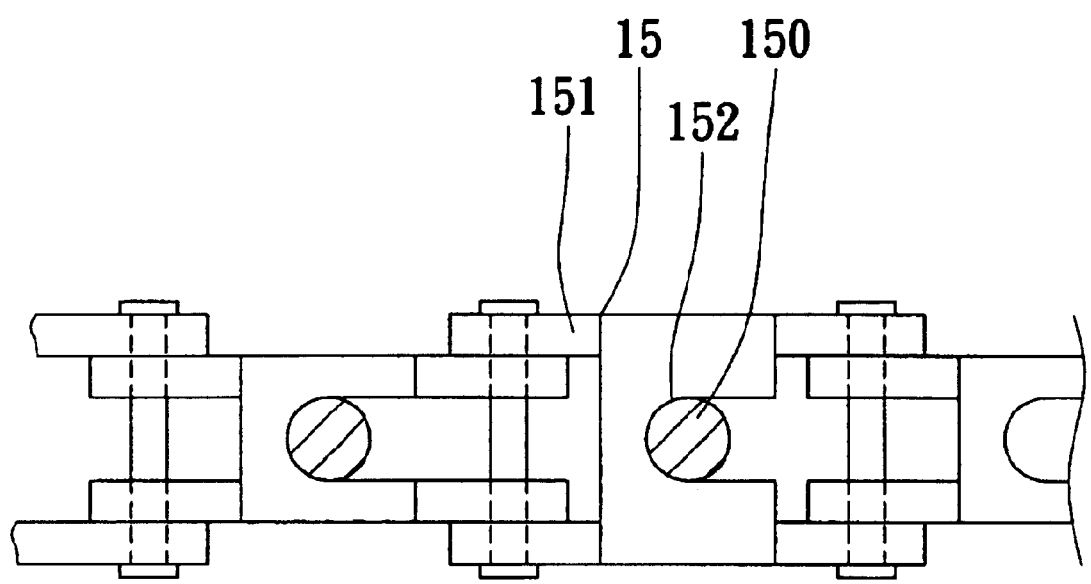
FIG. 4 is a schematic, fragmentary top view to illustrate how the carrier engages releasably the chain of the conveyer of FIG. 2.
Figure 5:
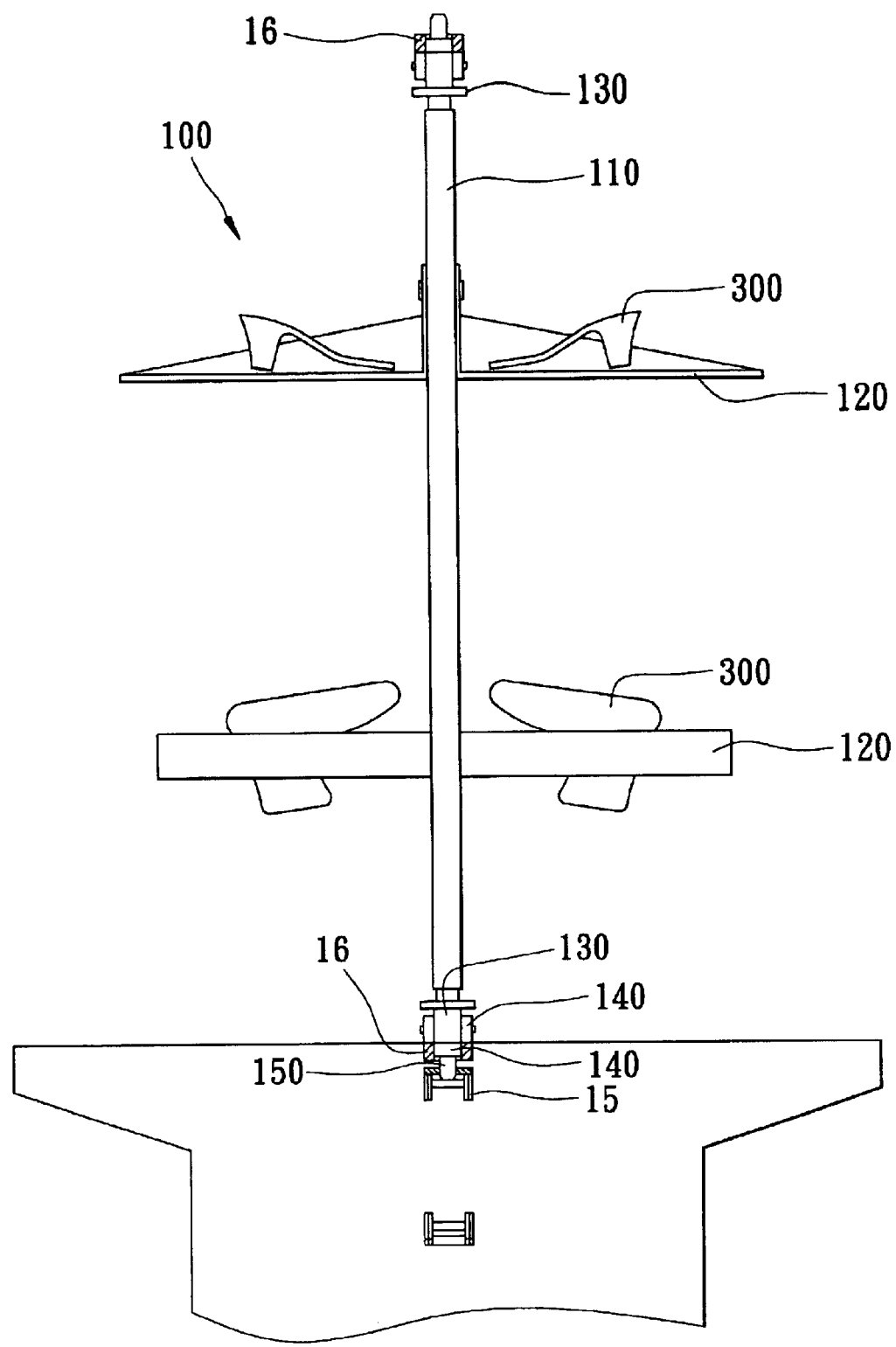
FIG. 5 is a schematic, fragmentary side view to illustrate how the carrier engages releasably the chain of the conveyer of FIG. 2.
Figure 6:
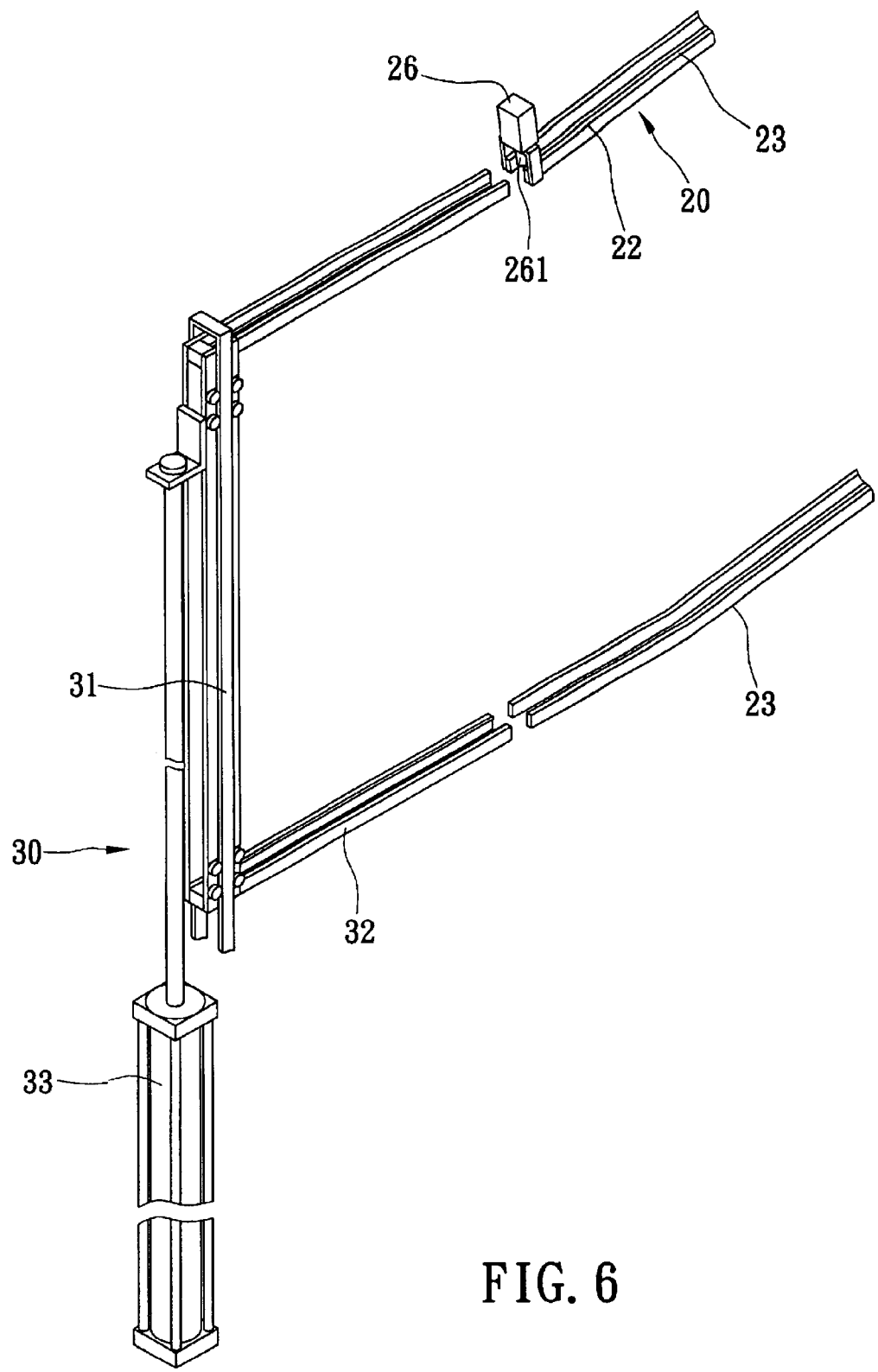
FIG. 6 is a schematic, fragmentary perspective view of a stopper on a carrier-returning line of the conveyer of FIG. 2.
Figure 9:
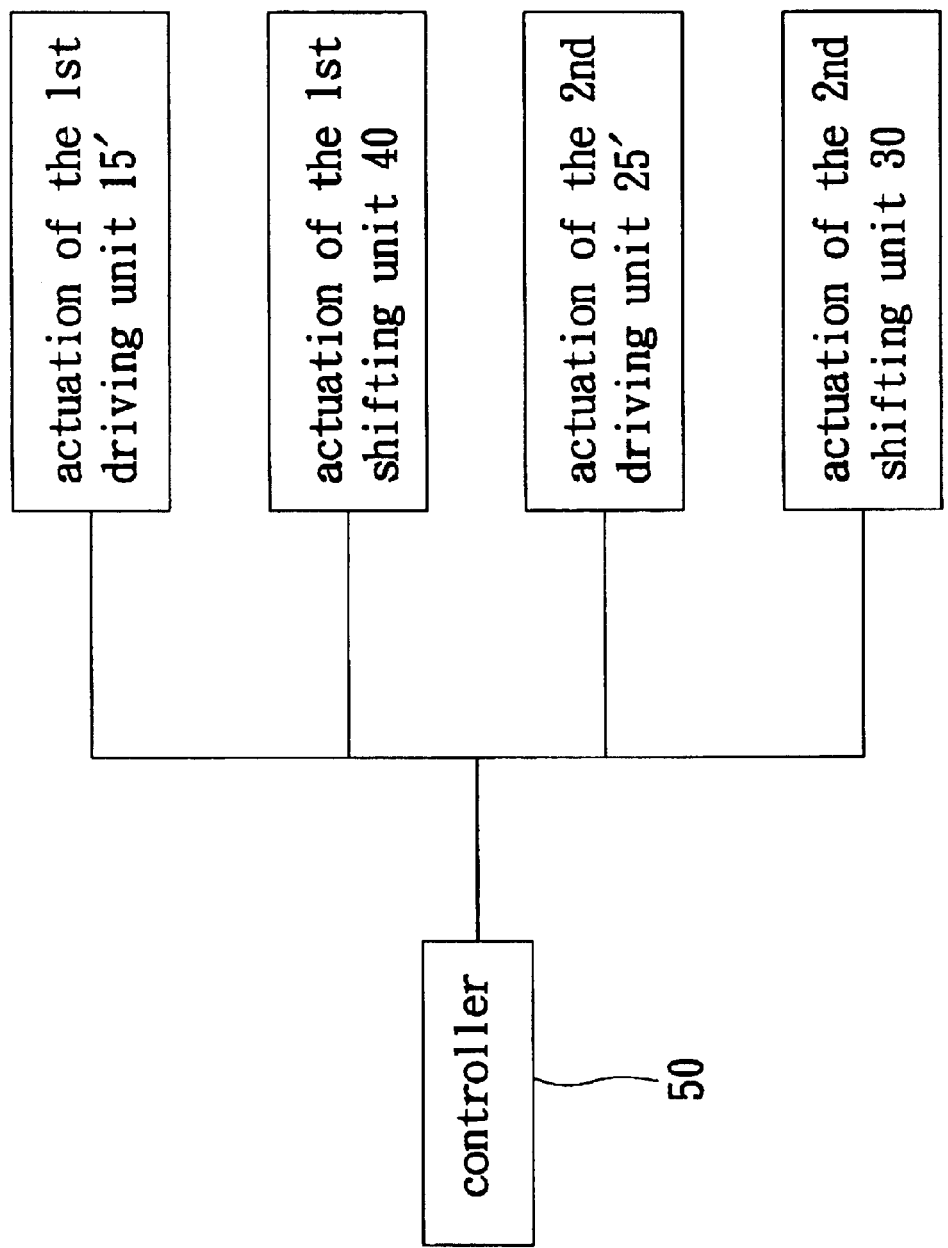
FIG. 9 is a block diagram to illustrate how actuation of first and second driving units and first and second shifting units is controlled through a controller of the footwear article conveyer.

The footwear article conveyer includes: an article-conveying line 10 adapted to extend through the work stations 250, adapted to receive the carriers 100 thereon and to permit sliding movement of the carriers 100 thereon, and having an article-loading end 11 and an article-unloading end 12; a first driving unit 15' adapted to drive the carriers 100 to move simultaneously along the article-conveying line 10 (engagement between the driving unit 15' and the carriers 100 will be described in greater detail in the succeeding paragraphs with reference to FIGS. 3 to 5); a carrier-returning line 20 separate from the article-conveying line 10 and having a carrier-loading end 21 and a carrier-unloading end 22; a first shifting unit 40 adapted to shift one of the carriers 100, which is disposed at the article-unloading end 12 of the article-conveying line 10, from the article-conveying line 10 to the carrier-loading end 21 of the carrier-returning line 20; a second driving unit 25' adapted to drive said one of the carriers 100 to move along the carrier-returning line 20 from the carrier-loading end 21 to the carrier-unloading end 22; a second shifting unit 30 adapted to shift said one of the carriers 100 from the carrier-unloading end 22 of the carrier-returning line 20 to the article-loading end 11 of the article-conveying line 10; and a controller 50 (see FIG. 9) that is coupled electrically to the first and second driving units 15', 25' and the first and second shifting units 40, 30 for controlling the movement of the carriers 100 on the article-conveying line 10 and the carrier-returning line 20 in such a manner that each of the carriers 100 on the article-conveying line 10 has a first duration time, which is the time required for moving from the article-loading end 11 to the article-unloading end 12, and that each of the carriers 100 on the carrier-returning line 20 has a second duration time, which is the time required for moving from the carrier-loading end 21 to the carrier-unloading end 22 and which is preferably shorter than the first duration time. The carriers 100 on the article-conveying line 10 are preferably driven intermittently by the first driving unit 151 to move simultaneously along the article-conveying line 10 by a predetermined distance each time.

Referring now to FIGS. 2 to 5, the article-conveying line 10 includes a pair of parallel first sliding rails 16 adapted to permit sliding movement of the carriers 100 thereon. Each carrier 100 includes a support frame 110, article seats 120 secured to the support frame 110 and adapted to receive the footwear articles 300, and guides 130 formed on top and bottom ends of the support frame 110. Each of the first sliding rails 16 defines a guiding groove for extension of the guides 130 of the carriers 100 therethrough. The first driving unit 15' includes a pair of first driving rollers 13, 14 that are respectively disposed adjacent to the article-loading end 11 and the article-unloading end 12 of the article-conveying line 10, and a chain 15 that is trained on the first driving rollers 13, 14 and that is adapted to engage releasably each of the carriers 100 so as to drive the carriers 100 to slide on the first sliding rails 16. The chain 15, which can be driven by a motor (not shown), includes a plurality of serially connected linkages 151, and a plurality of U-shaped engaging plates 152, each of which is secured to a respective one of the linkages 151 and each of which defines a recess. Each of the guides 130 includes a pair of vertical rollers 140 and a horizontal roller 141 which are in sliding contact with the respective one of the first sliding rails 16; and an engaging tongue 150 which extends through the recess in a respective one of the U-shaped engaging plates 152 of the chain 15.

Referring again to FIG. 2, the carrier-returning line 20 includes a pair of parallel second sliding rails 23 that are adapted to permit sliding movement of said one of the carriers 100 thereon, and that are disposed above the first sliding rails 16. The second driving unit 25' includes a pair of second driving rollers 255 that are respectively disposed adjacent to the carrier-loading end 21 and the carrier-unloading end 22 of the carrier-returning line 200, and a belt 25 that is trained on the second driving rollers 255 and that has a toothed outer surface 251 which is adapted to engage frictionally said one of the carriers 100 so as to drive the latter to slide on the second sliding rails 23.

Figure 1:
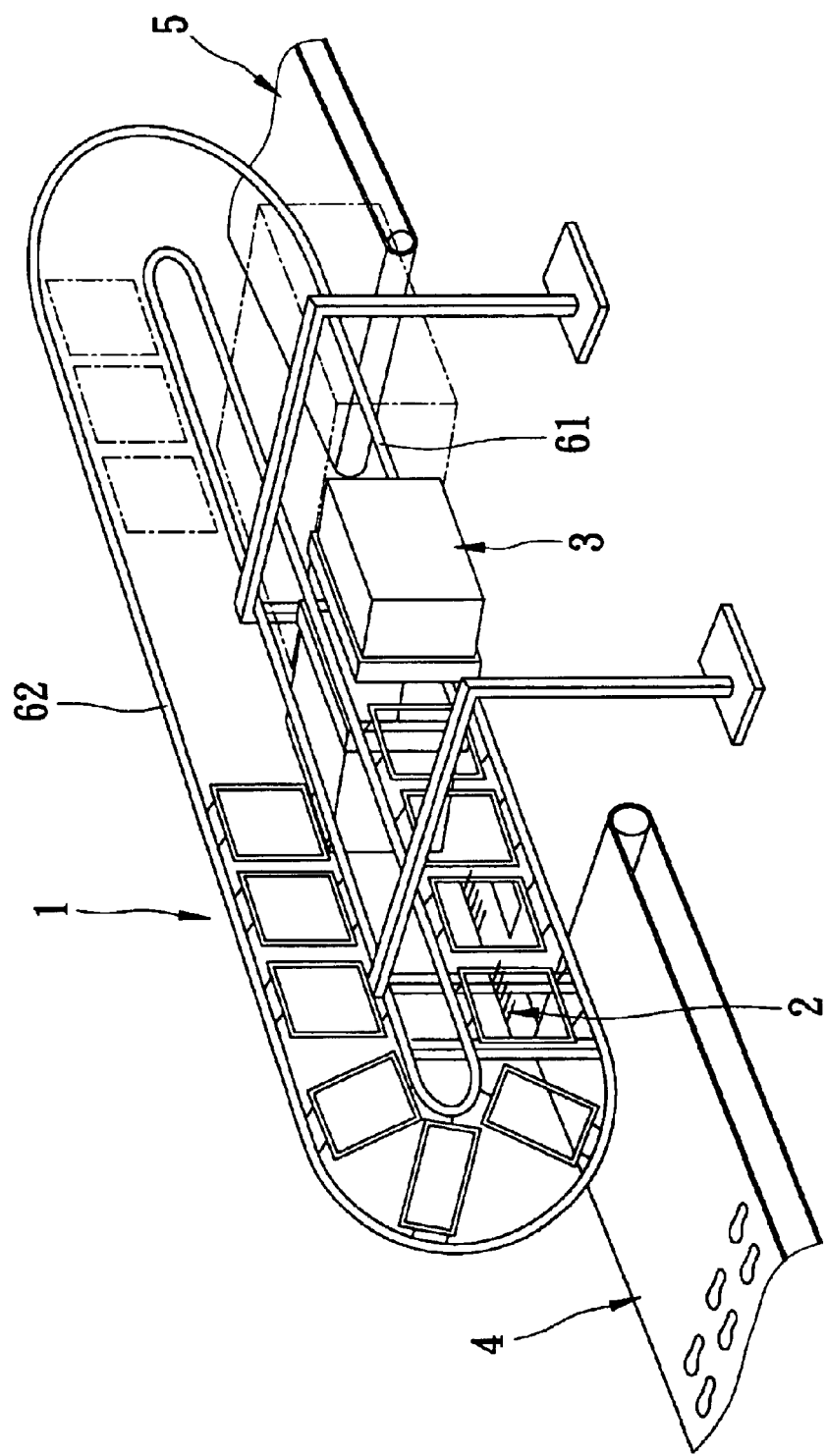
FIG. 1 is a fragmentary perspective view of a conventional footwear article conveyer.
Figure 2:
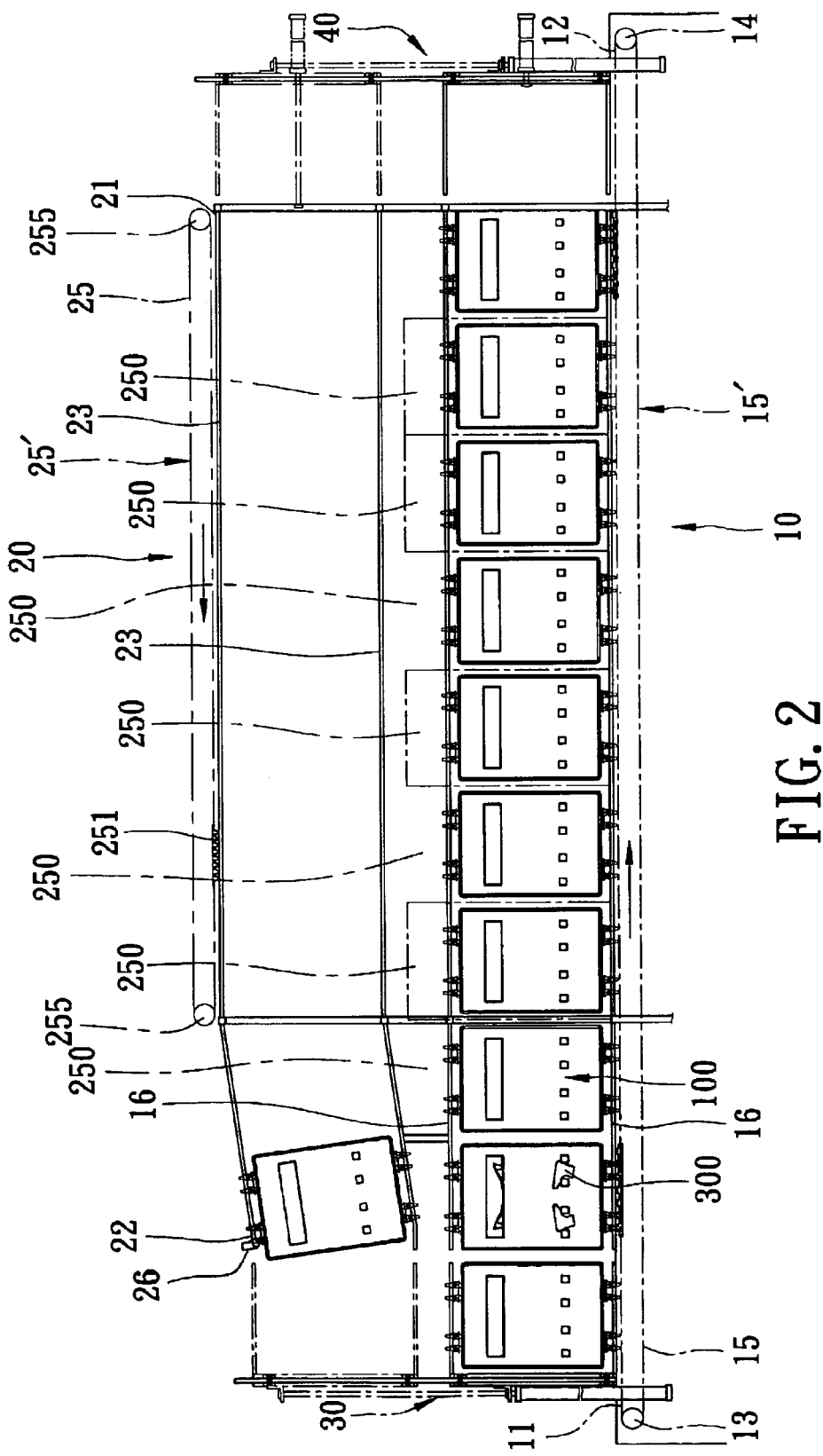
FIG. 2 is a schematic view of a footwear article conveyer embodying this invention.
Figure 7:
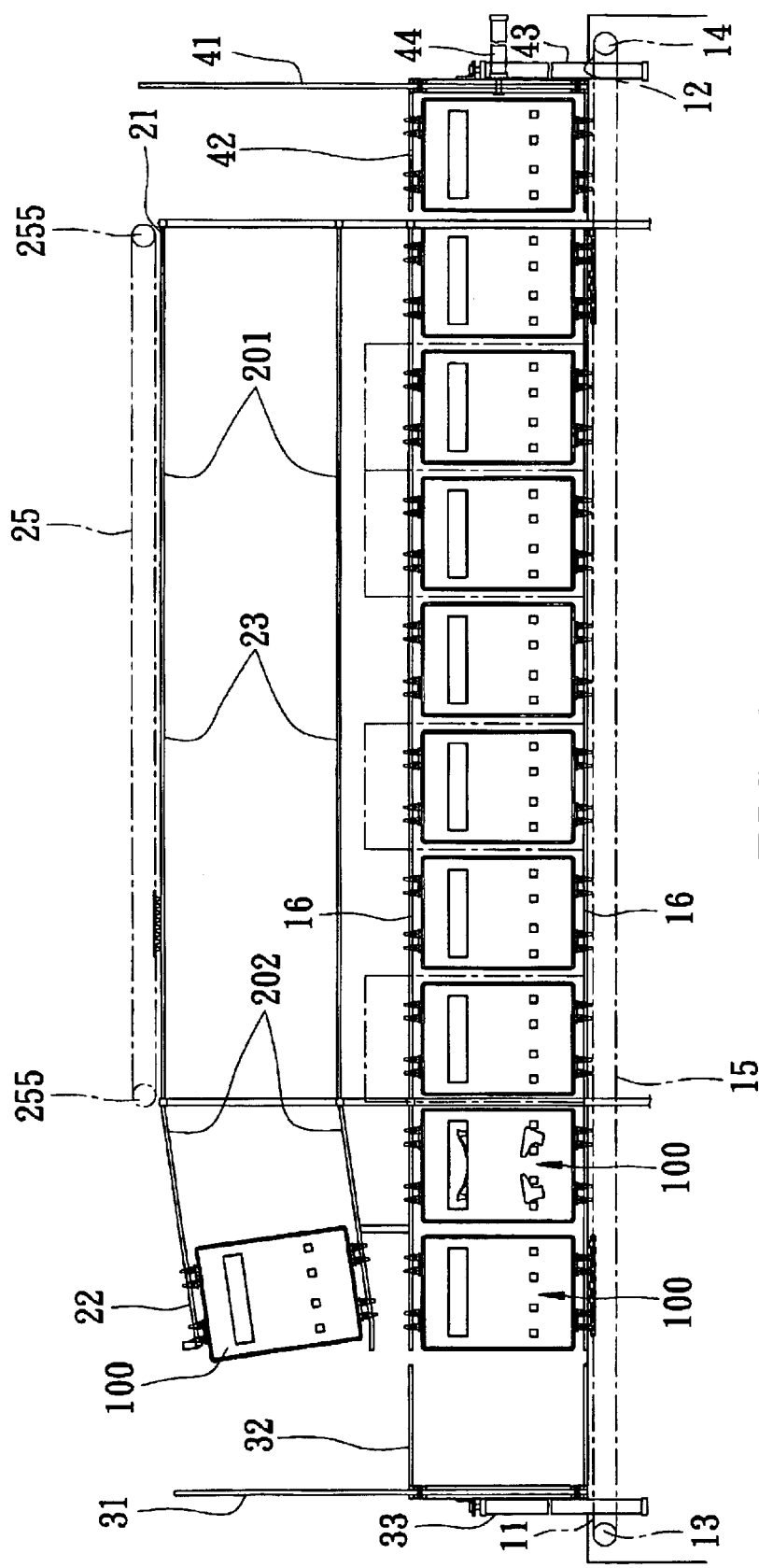
FIGS. 7 and 8 are schematic views to illustrate how a carrier is shifted between the article-conveying line and the carrier-returning line.
Figure 8:
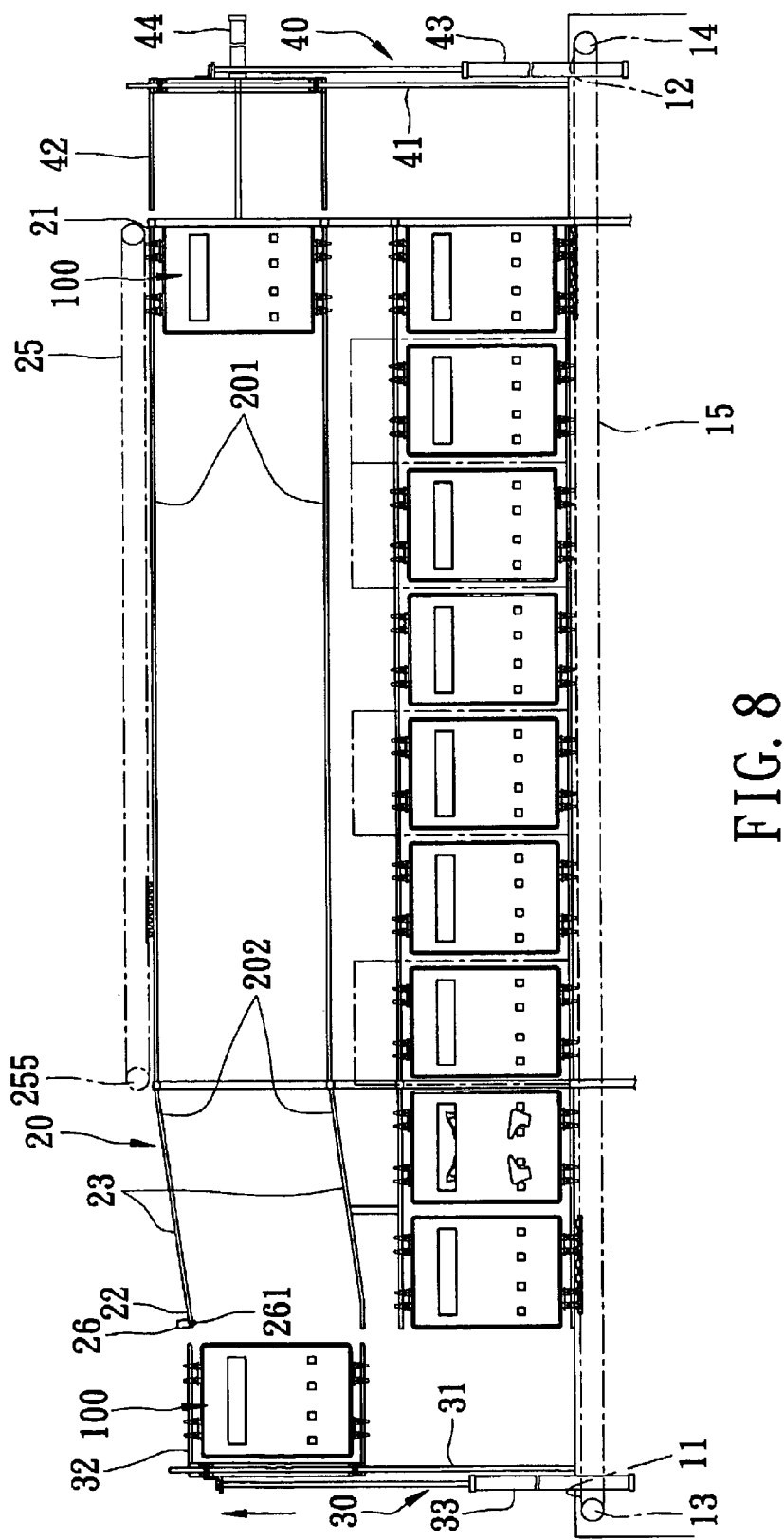

Referring now to FIGS. 7 and 8, in combination with FIG. 2, the first shifting unit 40 includes a first vertical support 41, a first stage 42 mounted movably on the first vertical support 41, and a first hydraulic cylinder 43 connected to the first stage 42 so as to move hydraulically the first stage 42 between a first lower position (see FIG. 7), in which the first stage 42 is disposed at a first level corresponding to the article-unloading end 12 of the article-conveying line 10, thereby permitting horizontal shifting of said one of the carriers 100 to the first stage 42, and a first upper position (see FIG. 8), in which the first stage 42 is disposed at a second level corresponding to the carrier-loading end 21 of the carrier-returning line 20, thereby permitting horizontal shifting of said one of the carriers 100 to the carrier-loading end 21 of the carrier-returning line 20. The first shifting unit 40 further includes a horizontal hydraulic cylinder 44 that is connected to the first hydraulic cylinder 43 so as to be movable therewith, and that is operable to move said one of the carriers 100 from the first stage 42 to the carrier-loading end 21 of the carrier-returning line 20.

The carrier-returning line 20 has a horizontal section 201 extending from the carrier-loading end 21 of the carrier returning line 20, and an inclined section 202 extending inclinedly and downwardly from the horizontal section 201 to the carrier-unloading end 22 of the carrier-returning line 20. The carrier-returning line 20 further includes a stopper 26 that is mounted movably on the carrier-unloading end 22 of the carrier-returning line 20 and that is operable to control the time of shifting of said one of the carriers 100 from the carrier-unloading end 22 of the carrier-returning line 20 to the article-loading end 11 of the article-conveying line 10. The stopper 26 includes a solenoid with a protrusion 261 (see FIG. 6) that is magnetically retractable so as to block and unblock said one of the carriers 100.

The second shifting unit 30 includes a second vertical support 31, a second stage 32 mounted slidably on the second vertical support 31, and a second hydraulic cylinder 33 connected to the second stage 32 so as to move hydraulically the second stage 32 between a second upper position (see FIG. 8), in which the second stage 32 is disposed at a third level corresponding to the carrier-unloading end 22 of the carrier-returning line 20, thereby permitting horizontal shifting of said one of the carriers 100 to the second stage 32, and a second lower position (see FIG. 7), in which the second stage 32 is disposed at a fourth level corresponding to the article-loading end 11 of the article-conveying line 10, thereby permitting horizontal shifting of said one of the carriers 100 to the article-loading end 11 of the article-conveying line 10.

With the inclusion of the carrier-returning line 20 and the first and second shifting units 40, 30 in the footwear article conveyer of this invention, the aforesaid drawbacks as encountered in the prior art can be eliminated.

With the invention thus explained, it is apparent that various modifications and variations can be made without departing from the spirit of the present invention.

I claim:

1. A footwear article conveyer adapted for use with a plurality of carriers so as to carry footwear articles through a series of work stations, said conveyer comprising:

an article-conveying line adapted to extend through the work stations, adapted to receive the carriers thereon and to permit sliding movement of the carriers thereon, and having an article-loading end and an article-unloading end, wherein said article-conveying line includes a pair of parallel first sliding rails adapted to permit sliding movement of the carriers thereon;

a first driving unit adapted to drive intermittently the carriers to move simultaneously along said article-conveying line by a predetermined distance each time, wherein said first driving unit includes a pair of first driving rollers that are respectively disposed adjacent to said article-loading end and said article-unloading end of said article-conveying line, and a chain that is trained on said first driving rollers and that is adapted to engage releasably each of the carriers so as to drive the carriers to slide on said first sliding rails;

a carrier-returning line separate from said article-conveying line and having a carrier-loading end and a carrier-unloading end, wherein said carrier-returning line includes a pair of parallel second sliding rails adapted to permit sliding movement of said one of the carriers thereon, and disposed above said first sliding rails;

a first shifting unit adapted to shift one of the carriers, which is disposed at said article-unloading end of said article-conveying line, from said article-conveying line to said carrier-loading end of said carrier-returning line;

a second driving unit adapted to drive said one of the carriers to move along said carrier-returning line from said carrier-loading end to said carrier-unloading end, wherein said second driving unit includes a pair of second driving rollers that are respectively disposed adjacent to said carrier-loading end and said carrier-unloading end of said carrier-returning line, and a belt that is trained on said second driving rollers and that has a toothed outer surface which is adapted to engage frictionally said one of the carriers so as to drive said one of the carriers to slide on said second sliding rail; and a second shifting unit adapted to shift said one of the carriers from said carrier-unloading end of said carrier-returning line to said article-loading end of said article-conveying line;

wherein said first shifting unit includes a first vertical support, a first stage mounted movably on said first vertical support, and a first hydraulic cylinder connected to said first stage so as to move hydraulically said first stage between a first lower position, in which said first stage is disposed at a first level corresponding to said article-unloading end of said article-conveying line, thereby permitting horizontal shifting of said one of the carriers to said first stage, and a first upper position, in which said first stage is disposed at a second level corresponding to said carrier-loading end of said carrier-returning line, thereby permitting horizontal shifting of said one of the carriers to said carrier-loading end of said carrier-returning line, and wherein said first shifting unit further includes a horizontal hydraulic cylinder that is connected to the first hydraulic cylinder so as to be movable therewith, and that is operable to move said one of the carriers from said first stage to said carrier-loading end of said carrier-returning line.

2. The footwear article conveyer of claim 1, wherein said carrier-returning line has a horizontal section extending from said carrier-loading end of said carrier returning line, and an inclined section extending inclinedly and downwardly from said horizontal section to said carrier-unloading end of said carrier-returning line, said carrier-returning line further including a stopper that is mounted movably on said carrier-unloading end of said carrier-returning line and that is operable to control time of shifting of said one of the carriers from said carrier-unloading end of said carrier-returning line to said article-loading end of said article-conveying line.

3. The footwear article conveyer of claim 2, wherein said second shifting unit includes a second vertical support, a second stage mounted slidably on said second vertical support and a second hydraulic cylinder connected to said second stage so as to move hydraulically said second stage between a second upper position, in which said second stage is disposed at a third level corresponding to said carrier-unloading end of said carrier-returning line, thereby permitting horizontal shifting of said one of the carriers to said second stage, and a second lower position, in which said second stage is disposed at a fourth level corresponding to said article-loading end of said article-conveying line, thereby permitting horizontal shifting of said one of the carriers to said article-loading end of said article-conveying line.

* * * * *